United States Patent [19]

Yang et al.

[11] 4,252,778

[45] Feb. 24, 1981

[54] FUEL GAS DESULFURIZATION

[75] Inventors: Ralph T. Yang, Tonawanda; Ming-Shing Shen, Rocky Point, both of N.Y.

[73] Assignee: The United States of America as represented by the United States Department of Energy, Washington, D.C.

[21] Appl. No.: 972,156

[22] Filed: Dec. 21, 1978

[51] Int. Cl.³ .............................................. B01D 53/34
[52] U.S. Cl. .................................... 423/230; 423/231; 423/244; 252/191; 252/192
[58] Field of Search .................... 423/230, 231, 573.6, 423/244 A; 252/191, 192

[56] References Cited

U.S. PATENT DOCUMENTS

| | | | |
|---|---|---|---|
| 1,154,859 | 9/1915 | Heckman | 252/191 |
| 2,429,759 | 10/1947 | Hopton | 423/231 |
| 2,979,384 | 4/1961 | Weiner et al. | 423/231 |
| 4,061,716 | 12/1977 | McGauley | 423/244 A |

*Primary Examiner*—Earl C. Thomas
*Attorney, Agent, or Firm*—James E. Denny; Raphael V. Lupo; Leonard Belkin

[57] ABSTRACT

A method for removing sulfurous gases such as $H_2S$ and COS from a fuel gas is disclosed wherein limestone particulates containing iron sulfide provide catalytic absorption of the $H_2S$ and COS by the limestone. The method is effective at temperatures of 400° C. to 700° C. in particular.

8 Claims, No Drawings

FUEL GAS DESULFURIZATION

FIELD OF THE INVENTION

This invention relates to the removal of sulfurous gases. Specifically this invention relates to the absorption of sulfurous gases by particulates.

BACKGROUND AND DISCUSSION OF PRIOR ART

This invention was made under, or during the course of, a contract with the United States Department of Energy.

The removal of sulfurous gases from a gas stream was often achieved by gas-liquid "washing" operations, particularly where the gas was passed through a salt solution. Such washing operations are disclosed in Hawkes, U.S. Pat. No. 2,689,164, granted Sept. 14, 1954; Buxton, Jr., U.S. Pat. No. 3,574,556, granted Apr. 13, 1971; and Kruger, U.S. Pat. No. 3,988,422, granted Oct. 26, 1976. Moore, U.S. Pat. No. 3,919,390, granted Nov. 11, 1975 proposes to clean fuel gases by passing the fuel gases through molten carbonates.

It was early recognized in the art that effluent gases may be scrubbed by passing the effluent over water insoluable carbonates in the presence of water as disclosed in Canon, U.S. Pat. No. 1,716,028, granted June 4, 1929.

Craig et al, U.S. Pat. No. 3,966,431, granted June 29, 1976, discloses another desulfurization containing a CaO/CaS particulate material.

In Capell et al, U.S. Pat. No. 2,433,426, granted Dec. 30, 1947, it was disclosed that hydrogen sulfide could be removed by contact with an iron oxide and hydrated fuller's earth absorbent.

There is now provided by the present invention a method of solid particulate-gas desulfurization, wherein the presence of sulfurous iron compounds improve the absorption of the particulate sorbent, such as limestone.

It is therefore a principle object of this invention to provide a method for the improved desulfurization of gases by solid sorbents.

It is another object of this invention to provide a method as aforesaid for fuel gas desulfurization.

It is still another object of this invention to provide a method as aforesaid to improve the absorption of sulfurous gases by limestone particulates.

It is still a further object of this invention to provide a method as aforesaid which may be used in conjunction with coal gasification processes.

The aforesaid as well as other objects and advantages will become apparent from a reading of the following description and the adjoined claims.

DESCRIPTION OF THE PREFERRED EMBODIMENTS

Broadly speaking this present invention comprises the desulfurization of a gas by solid particulate sorbents comprising sulfurous iron compounds. More specifically this invention may be said to be a method for removing sulfurous gases from a fuel gas by contacting with limestone particulates which particulates comprise iron sulfide, at elevated temperatures.

In a further specific embodiment this present invention is a method for the removal of sulfurous gases from a fuel gas which comprises;

(a) coating limestone particulates with aqueous solution of iron sulfate and/or iron sulfite;
 (b) drying the coated particulates; and
 (c) contacting the particulates with hot gas containing sulfurous gases for absorption of the sulfurous gases by the particulates.

It is also to be understood that other aqueous iron solution may be employed in the present invention such as iron salt solution which will undergo decomposition under the stated conditions of the present invention.

In a more specific aspect this present invention comprises;

(a) calcining limestone particulates to form lime;
 (b) contacting the lime particulates with an aqueous iron salt solution;
 (c) drying the lime particulates; and
 (d) heating the treated lime particulates to 400° C. to 900° C. in the presence of a gas comprising a sulfurous gas.

It has surprisingly been found that limestone particulates when coated with iron sulfite or iron sulfate, undergo a reduction in a sulfurous gas atomsphere, to form FeS on the particulates, such particulates catalyze the absorption of sulfurous gases by the limestone. It has been found that improvement in absorption is achieved at gas temperatures of 400° C. up to about 900° C., although temperatures between about 400° C. to 700° C. show the most marked level of improvement.

Fuel gases contain several impurities, particularly sulfurous gases (e.g. $H_2S$, COS, and the like), which impurities have been effectively removed by the practice of the present invention.

It has also surprisingly been found that the improved rates of absorption are achieved with the particulate sorbents in the dry state without the need for aqueous media to assist in the removal of the sulfurous gases.

Without wanting to be bound by any theory or mechanism it is believed that the iron sulfate/sulfite reacts with the $H_2S$ and COS to form in situ FeS which catalyzes the absorption of the $H_2S$ and/or COS in the limestone. More specifically the iron sulfate/sulfite may be reacted to first form the iron oxide and then the iron oxide reduced to free iron which would then react with the sulfurous gases in the reducing atmosphere to form FeS. The $H_2S$ and COS are absorbed on the solid sorbents. The particulate sorbents are preferably calcined limestone, such that there is a dry porous lime structure which is found to absorb the $H_2S$ and COS from a reducing atmosphere.

The following example is illustrative of the invention.

EXPERIMENTAL EXAMPLE

A sample of Greer limestone particulates of 16/20 Tyler mesh, supplied by Greer Limestone Co., Morgantown, W.V., was employed in this example. The limestone was calcined at 900° C. in a blanket of $N_2$ to provide a porous product having pore diameter size range of 0.2 to 0.4 microns. Reagent grade ferric sulfate was dissolved in water to provide a 3 molar concentration. The lime particulates were then soaked in the ferric sulfate solution for about 2 minutes and then removed. The solution-treated particulates were air-dried, and then rapidly heated at 25° C./minute in $N_2$ to 900° C. (Thermal Gravimetric Analysis method). Distinct stages in weight loss were noted as moisture loss below 200° C. and thermal decomposition of ferric sulfate about 600° C. The amount of $Fe_2O_3$ formed on the lime surface was calculated from the weight as per the following reaction:

$$Fe_2(SO_4)_3 \rightarrow Fe_2O_3 + 3SO_3$$

Nitrogen (99.99% purity), hydrogen (99.95% purity) from commercial gas cyliners; and hydrogen sulfide (2.08% $H_2S$ in $N_2$) as supplied by the Matheson Company were employed to provide a test gas mixture. Hydrogen was added to the $H_2S$ mixture both to simulate the reducing atmosphere found in coal gases and to prevent decomposition of $H_2S$ at high temperature. Nitrogen constituted the remainder of the test gas feed which has a $H_2S$ concentration of 0.20%.

The rates of sulfidation were conducted using a DuPont thermo-analyzer Model 951, and a small quartz boat with an area of about 0.6 $cm^2$ was used as the sample holder (a platinum boat was not used to avoid possible catalytic effects).

$H_2S$ reactivity measurements were determined isothermally at the various specified temperatures over a range of 400°–900° C. at 1 atm total pressure.

About 40 mg of lime sample was spread into a thin layer on the holder as the solid reactant. The gas mixture flowed over the sample surface at a velocity of about 10 cm/sec. This velocity was pre-determined to be high enough to minimize the role played by the gas film diffusion, or the overall rate did not increase with further increase in the velocity. Reagent grade iron oxide powder was shown to be reduced to iron at about 400° C. in Hydrogen gas. Therefore, for the experiments at temperatures above 400° C., iron oxide was apparently reduced to iron before sulfidation.

The results are shown in Table 1 as follows:

TABLE 1

Percent completion of the reaction: $CaO + H_2S \rightarrow CaS + H_2O$ (after 2 hours)

| Temperature | Calcined Greer (Without Impregnation) | Calcined Greer (With Impregnation) |
|---|---|---|
| 400° C. | 1.25% | 3.08% |
| 700° C. | 12.75% | 22.48% |
| 800° C. | 29.19% | 29.12% |
| 900° C. | 43.14% | 26.87% |

Thus, it can be seen that Fe improved rates of absorption between 400° C. to 700° C.; and there is also absorption to 900° C.

In the present invention the iron compounds imbedded in the sorbent particulates, may undergo compositional changes, but at least some point in the process the iron combines with sulfur.

It is to be borne in mind that the present invention contemplates improved rate of sulfurous gas removal by a non-aqueous treatment.

The particulates of the present invention are preferably calcined limestone having a pore diameter range of 0.1 to 0.5 microns and preferably 0.2 to 0.4 microns. Other particulates, particularly metal oxides stable at 400° to 900° C. may be useful pursuant to the present invention.

The method of the present invention is particularly useful in the removal of sulfurous gases from fuel gas, such as coal gas and the like, although the broad application of the sulfurous gas removal is contemplated by the present invention.

The preceding specific embodiments are all illustrative of the practice of the invention. It is to be understood, however, that other expedients known to those skilled in the art may be utilized without departing from the spirit of the invention or the scope of the appended claims.

What is claimed is:

1. A method for the removal of sulfurous gases from reducing gases comprising:
    (a) calcining limestone particles to form a porous lime,
    (b) contacting the lime particles with an aqueous iron salt solution, said salt comprising one of iron sulfate and iron sulfite, whereby the particulates are coated with the salt solution;
    (c) drying the coated lime particulates; and,
    (d) heating the coated lime particulates to 400° to 700° C. in the presence of a reducing gas, said reducing gas comprising a sulfurous gas.

2. The method of claim 1 wherein said reducing gas is a fuel gas and said sulfurous gases comprise $H_2S$ and COS.

3. The method of claim 2, said iron sulfate or iron sulfite being reacted with $H_2S$ and COS to form iron sulfide, said iron sulfide catalyzing the absorption of the $H_2S$ and COS on said limestone.

4. The method of claim 1, said gas providing a reducing atmosphere.

5. The method of claim 1, said iron salt solution being about 3 molar concentrations.

6. The method of claim 1, wherein the percent completion for the removal of the sulfide gas is more than 20% after 2 hours of step (d).

7. The method of claim 6, wherein the sulfide gas is $H_2S$.

8. The method of claim 1, wherein the porosity of the lime is in the range of 0.2 to 0.4 microns.

* * * * *